United States Patent [19]

Stites

[11] Patent Number: 4,525,863
[45] Date of Patent: Jun. 25, 1985

[54] SOLID STATE TRANSMIT/RECEIVE SWITCH

[75] Inventor: Francis H. Stites, Wayland, Mass.

[73] Assignee: GTE Laboratories Incorporated, Waltham, Mass.

[21] Appl. No.: 543,570

[22] Filed: Oct. 19, 1983

[51] Int. Cl.³ .............................................. H04B 1/48
[52] U.S. Cl. .................................................... 455/83
[58] Field of Search ...................... 455/78, 79, 82, 83; 370/32

[56] References Cited

U.S. PATENT DOCUMENTS 2,924,704  2/1960  Horowitz et al. ..................... 455/82
3,227,954  1/1966  Fichter, Jr. ............................ 455/82
4,203,109  5/1980  Ballard et al. ........................ 455/83

Primary Examiner—Marc E. Bookbinder

[57] ABSTRACT

A transmit/receive switching circuit for radio transceivers includes a switch, which, when closed, provides conduction for two serially connected, polarity opposed diodes. When these diodes conduct, a path is provided for signals from an amplifier, or antenna, to pass through to the receiver. When the switch is open, that path is inoperative so that signals from the antenna (for example, lightning pulses) do not pass through those diodes to the receiver (which passage would cause overloading and damage). Automatic override means, for causing a transistor switch to cease conduction in the event the transistor had been conducting when transmission signals are initiated from the amplifier, include a comparator circuit coupled to compare the magnitude of voltage obtained via a coupling to the transistor switch or to the antenna, against a standard, to cause the transistor switch to cease conduction in the event that the magnitude exceeds the standard.

6 Claims, 4 Drawing Figures

SOLID STATE TRANSMIT/RECEIVE SWITCH

BACKGROUND OF THE INVENTION

1. Field of the Invention

This invention relates to solid state transmit/receive switches and, in particular, to transmit/receive switching circuits for radio transceivers. Accordingly, it is a general object of this invention to provide new and improved devices of such character.

A new and improved transmit/receive switching circuit in accordance with this invention provides an extremely reliable means for switching between transmit and receive (in a radio transceiver), requiring no external source of high voltage or current.

Further, a new and improved transmit/receive switching circuit in accordance with the invention provides automatic switching from a receive mode to a transmit mode when a significant voltage appears on the antenna line, whereby the receiver is protected against lightning, inadvertent transmitter operation, and electromagnetic pulses.

2. Description of the Prior Art

A common transmit/receive switch is, effectively, a single pole double throw device that connects the antenna either to the transmitter or to the receiver, as desired. Disadvantageously, the relay types in the prior art suffered from speed and reliability problems, while solid state versions often suffered from loss, especially in transmitting and often resulted in poor receiver isolation. Harmonic generation, occurring during transmission, provided the problem of off frequency received signals.

Solid state transmit/receive switches commonly utilized PIN diodes. PIN diodes, as is well known, is a diode that consists of a silicon wafer containing nearly equal P type and N type impurities with additional P type impurities diffused from one side and additional N type impurities diffused from the other side. PIN diodes differ from ordinary diodes in that the diode action is slow compared to the carrier frequency, with the result that a small reverse dc voltage (with the diode nonconducting) or a small forward dc current (with the diode conducting) controls much higher radio frequency voltages and currents. They work best at the higher rf frequencies where the speed of the diode is much slower than the carrier cycle time. Low frequency PIN diodes are available that are useful at medium frequencies, such as the Unitrode UM7010. All PIN diodes have low capacitance, which is desirable, but they require substantial forward current (in the hundreds of milliamperes) to attain a low forward resistance.

For many years, the function of a transmit/receive switch, for switching between transmit and receive modes, utilizing no external source of high voltage or current, was performed with a relay. More recently, PIN diodes have been utilized requiring external control voltages and currents. The function of providing automatic switching to transmit when significant voltages appear on the antenna line was not provided in the relay systems of the prior art, and they probably were not, to the knowledge of the applicant, utilized in PIN diode switches because circuits to change the control voltages would have to be added.

The relay circuits of the prior art tended to be unreliable and were large, slow and power consuming. The PIN diode systems of the prior art were lossy, generated harmonics and spurious frequency products from two or more signals and required an external supply of high voltage (with non-conducting diodes) and high currents (with conducting diodes). Especially at the lower frequencies, the voltage and current requirements became objectionably large for a good performing switch. The PIN diode switches often included a quarter wave transmission line that could be large at low frequencies which limited the bandwidth.

SUMMARY OF THE INVENTION

Another object of this invention is to provide a new and improved transmit/receive switch which does not contain the limitations of the prior art devices.

Yet another object of this invention is to provide a new and improved transmit/receive switch which is limited at its highest frequency of operation by the availability of those diodes of short enough reverse recovery time for the desired frequency.

Still other objects of this invention are to provide for a new and improved transmit/receive switching circuit which is highly reliable, has very fast operation, provides for low loss, provides for outstanding isolation, provides for automatic self protection, utilizes a small size and lightweight, requires no additional power supplies, is available at low cost and which provides protection to the receiver when the power is terminated.

In accordance with one aspect of the invention, a transmit/receive switching circuit for a radio transceiver includes first means for coupling to a transmitting amplifier and to an antenna, and includes a second means for coupling to a receiver. A serial circuit is coupled between the two means. The serial circuit includes two serially connected, polarity opposed diodes. Control means is operative during both receiving and the transmitting phases of the transceiver. The control means, when operative during the receiving phase of the transceiver, causes both of the serially connected, polarity opposed diodes to simultaneously conduct, so that radio signals received by the antenna can pass through the first means, the serial circuit, and the second means to the receiver. The control means, when operative during the transmitting phase of the receiver, causes both of the serially connected, polarity opposed diodes to not simultaneously conduct, so that neither the transmission signals from the transmitting amplifier nor radio signals from the antenna can pass through the first means, the serial circuit, and the second means to the receiver. The serial circuit includes a first diode poled in one direction, capacitive means, and a second diode poled in a direction opposite to the one direction. A resistive circuit direct current path is applied across the capacitive means, and means are provided for selectively applying a voltage potential to the path having such a magnitude and polarity as to cause both diodes to undergo conduction. In accordance with certain features of the invention, the means for selectively applying a voltage potential can be a switch, such as a transistor. The circuit can further include automatic override means, coupled to the transistor, for causing the transistor to cease conduction in the event the transistor had been conducting when transmission signals are initiated from the amplifier.

In accordance with a particular feature of the invention, the automatic override means includes a comparator circuit which is coupled to compare the magnitude of voltage obtained via a coupling to a point on the path, against a standard, to cause the transistor to cease conduction in the event the magnitude exceeds the standard. In accordance with another feature of the invention, the automatic override means includes a comparator circuit coupled to compare the magnitude of voltage obtained via a coupling to a point on the first means, against a standard, to cause the transistor to cease conduction in the event the magnitude exceeds the standard.

BRIEF DESCRIPTION OF THE DRAWINGS

Other objects, advantages, and features of this invention, together with its construction and mode of operation, will become more apparent from the following description, when read in conjunction with the accompanying drawing, in which.

DESCRIPTION OF PREFERRED EMBODIMENT(S)

Figure 1:
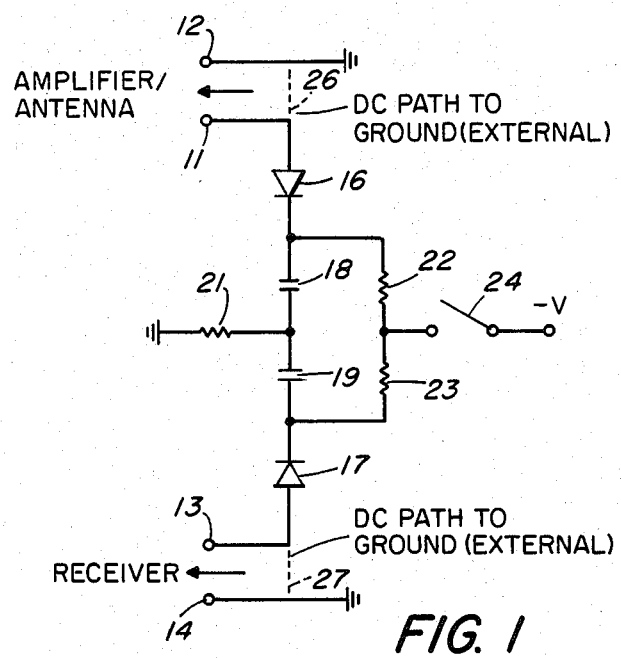
FIG. 1 is an electrical diagram of a circuit illustrating the basic concept of this invention.

Referring to the drawing, like reference numerals designate like circuits or elements.

Referring to FIG. 1, there is depicted a transmit/receive switching circuit in accordance with a basic concept of this invention. A transmitting amplifier and an antenna are commonly coupled to a pair of terminals 11 and 12. The terminal 12 is coupled to a point of reference potential, such as ground. Similarly, a receiver is coupled to a pair of terminals 13 and 14, the terminal 14 being coupled to a point of reference potential, such as ground. The terminals 11 and 12 can be at the center and outside leads, respectively, of a coaxial cable, and, likewise, the terminals 13 and 14 can be at the center and outside leads of a coaxial cable, respectively.

The terminal 11, as shown in FIG. 1, is coupled to the anode of a diode 16, whereas the terminal 13 is coupled to the anode of a diode 17. The cathode of the diode 16 is coupled to one plate of a capacitor 18, the other plate of which is coupled to one plate of a capacitor 19. The other plate of a capacitor 19 is coupled to the cathode of the diode 17.

The joint connection of the capacitors 18 and 19 is coupled via a resistor 21 to a point of reference potential, such as ground.

The cathode of the diode 16 is coupled via resistors 22 and 23 to the cathode of the diode 17. The joint connection of the resistors 22 and 23 is coupled via a switch 24 to a negative potential source.

The terminals 11 and 12 effectively have a dc path 26 thereacross which is externally provided either at the amplifier or the antenna. In similar fashion, the terminals 13 and 14 are coupled by way of a direct current path to ground via a path 27 which is externally provided in the receiver.

In operation, referring to FIG. 1, assume that the switch 24 (preferably, a transistor switch) is closed for a receiving operation. An input signal from the antenna is impressed upon the terminal 11. With the switch 24 closed, current flows from the negative potential source $-V$ through the switch 24, through the resistors 22 and 23, to the diodes 16 and 17, to the terminals 11 and 13, through the dc paths 26 and 27, to the point of reference potential, such as ground and, therefore, both diodes 16 and 17 are caused to conduct. Hence, during a receive operation, signals coming in from the antenna via the terminal 11 pass through the diode 16, through the capacitors 18 and 19, through the diode 17, and through the terminal 13 to the receiver.

When it is desired to transmit, the switch 24 is opened. Hence, signals from the transmitter, via the terminal 11, pass to the antenna. The signals from the amplifier fail to enter the receiver because the diodes 16 and 17 do not undergo simultaneous conduction. If there is a large signal present from the amplifier or if there is a sharp spike, due to an electromagnetic pulse or lightning from the antenna, which is applied to the terminal 11, that sharp signal will turn on the diode 16, traveling through the resistors 22 and 23, causing the diode 17 to cease conduction. Hence, no conductive path is present through the diodes 16 and 17, between the amplifier/antenna and the receiver, when the transistor switch 24 is open.

The deleterious signal need not be a sharp spike. Normal transmitting output will cause one of the diodes 16 and 17 not to conduct. This large spike or large signal can come either from the transmitter or it can come from a lightning surge or electromagnetic pulse. Whatever the hazardous voltage, the circuit of this invention automatically shuts itself off.

A mechanical relay of the prior art does not have this self-protection function.

The invention as depicted in FIG. 1 can include discrete elements. The switch 24 can be a transistor switch. The device as depicted can operate at high power (such as 1000 watts) and can utilize voltage in the hundreds of volts. With such high power, discrete elements are preferred.

As indicated hereinabove, the classic transmit/receive switch effectively is a single pole double throw device that connects the antenna either to the transmitter or to the receiver, as desired. However, a particular transmission power amplifier is available that, when not supplying power, provides a very high output impedance. With such a characteristic, during reception the amplifier need not be disconnected from the antenna receiver path. A transmit/receive switch, therefore, need not carry high power, and the switch becomes a single pole single throw device functioning only to disconnect the receiver when high voltage is present on the antenna line. This simplified requirement makes a solid state transmit/receive switch very attractive since the usual major problem of loss during transmission does not exist.

Because of the low medium frequency carrier, diode switching can be performed either with slow PIN diodes that act like two-value resistors, or fast recovery rectifiers that act like diodes. The fast diode approach is preferred because it eliminates a power supply (which provided 50 to 100 volts) to turn off the PIN diodes. It further reduces the forward current requirement by about ten times. The fast diode approach uses a first fast rectifier diode to produce a high voltage by rectifying the transmitter output, and then this voltage is used to bias off a second diode. Reception is accomplished by passing a forward current of 20 mA through the two diodes by means of a high voltage transistor and −15 volt supply. A pair of additional low voltage clipping diodes can be used to assure that no voltages above one volt can pass through the receiver during turn on or turn off or during other transient situations such electromagnetic pulses or lightning.

The switching action can be controlled by a logic level signal from a controller, wherein a logic high enables the receive operation.

Another automatic circuit can be provided to override the logic command and place the transmit/receive switch in transmitting mode whenever the peak-to-peak voltage on the power amplifier-antenna line exceeds a predetermined value, such as eleven volts. This action occurs in microseconds, and, together with the clipping diodes, protects the receiver from lightning, electromagnetic pulse, inadvertent or improper transmitter operation, or any other high voltage. A separate fast detector and comparator can provide this self protection function.

Figure 2:
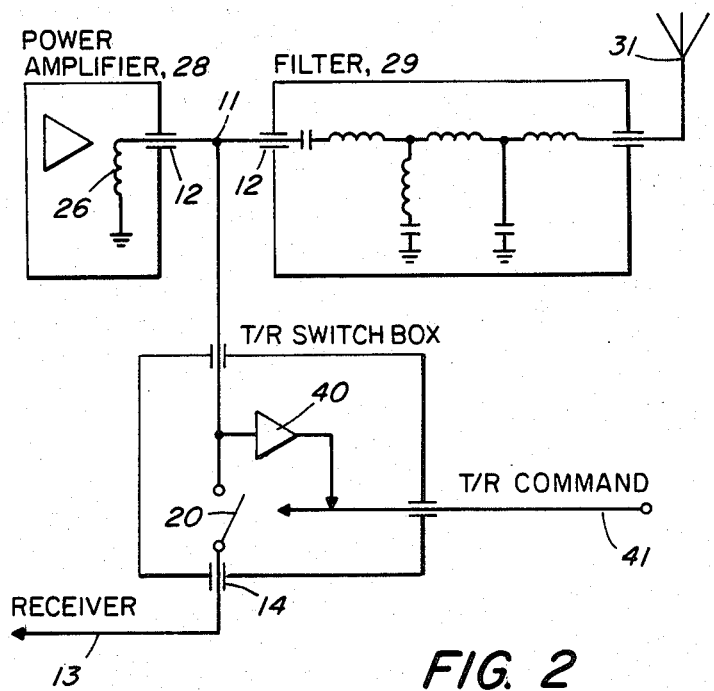
FIG. 2 is a block diagram of one embodiment of this invention.

Referring to FIG. 2, there is shown the transmit/receive switch in block diagram. The dc path to ground, as indicated therein, can be by way of a coil coupled from the terminal 11 to ground. A power amplifier 28 can be supplied to generate a signal to the coil 26. The terminal 11 can be further coupled through a filter 29 to the antenna 31. The filter 29 can be a harmonic filter in accordance with known techniques. As depicted in FIG. 2, the transmit/receive switch is connected in shunt with the power amplifier 28 junction with the filter 29, thereby taking advantage of filter rejection during a receive mode.

As indicated above, FIG. 1 is a circuit diagram, wherein the diode rectifier 16 charges the two capacitors 18 and 19, nearly ceasing conduction, and causing the diode 17 to cease conduction. During the receive mode, the transmit/receive switch 24 is closed, passing equal current (about 20 milliamperes) through the diodes 16 and 17 to ground, providing a path for small signals.

Figure 3:
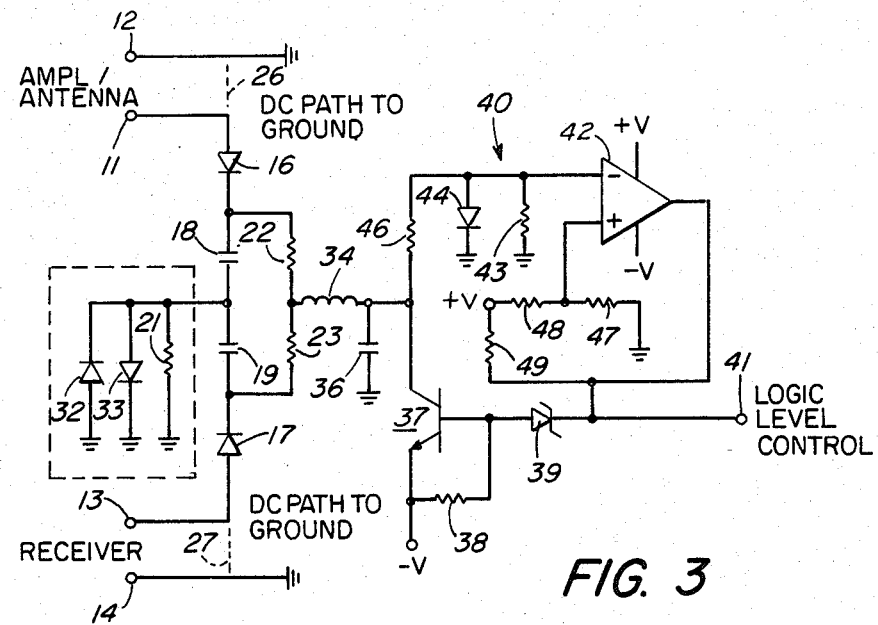
FIG. 3 is a diagram of a transmit/receive switching circuit, including automatic override, in accordance with another embodiment of this invention.

FIG. 3 is more complete schematic illustrating a pair of back to back limiting diodes 32, 33 which couple the juncture of the capacitors 18 and 19 to a point of reference potential, such as ground, the two diodes 32, 33 being oppositely poled. These limiting diodes thereby clip any transient voltage spikes as they unexpectedly appear. This protects the receiver from failed components elsewhere in the system or from delayed operation of the automatic override function as will be more apparent hereinafter. The circuit of FIG. 3 includes an isolating rf choke 34 coupled between the junction of the resistors 22, 23 and to one plate of a capacitor 36, the other plate of which is coupled to a point of reference potential. The one plate of the capacitor 36 is coupled to the collector of a NPN type transistor 37, such as a high voltage type 2N5013. The emitter of the transistor 37 can be coupled to a negative potential source −V. A resistor 38 is coupled between the base and the emitter of the transistor 37. The base of the transistor 37 is coupled through the anode of a zener diode 39, whose cathode is coupled to a terminal 41 which receives a logic level control.

Referring still to FIG. 3, a comparator 42 is provided which can be of the type LM111. The comparator 42 is provided with suitable enabling voltages +V and −V. The automatic override circuit 40 has a resistor 43 coupling the negative input terminal of the comparator 42 to a point of reference potential, such as ground. The cathode of the zener diode is coupled to the negative terminal of the comparator 42, the anode of which is coupled to a point of reference potential, such as ground. Also coupled to the negative terminal of the comparator 42 is a resistor 46 which is coupled to the collector of the transistor 37. The positive terminal of the comparator 42 is coupled via one resistor 47 to a point of reference potential, such as ground, and is coupled by another resistor 48 to a positive potential source +V. The positive potential source +V is coupled via a resistor 49 to the output of the comparator 42.

The output of the comparator 42 is coupled to the cathode of the zener diode 39. Referring again to FIG. 3, the transmit/receive switching circuit including the 2N5013 high voltage transistor 37 performs the switching function of the switch 24, FIG. 1. The zener diode 39, FIG. 3, is a convenient device for matching a standard 0–5 volt logic level command. The comparator 42 and its associated components sense the presence of rectified rf voltage, and when rf voltage exceeds the two volt bias, the LM111 comparator 42 conducts, overriding the logic level receive command at the cathode of the zener diode 39, if present. Such conduction by the comparator 42 forces the transistor switch 37 to the transmit mode protecting both the receiver and the switch itself. The 4 volt zener diode 39 prevents excessive voltage from damaging the comparator 42.

In the embodiment depicted in FIG. 1, during the receive mode, the switch 24 is closed, enabling conduction of the diodes 16 and 17, so that signals arriving from the antenna 11 are passed directly to the receiver 13 via the diodes 16 and 17, and the capacitors 18 and 19. Then, when it is desired to transmit, the switch 24 is opened, subsequent to which the transmitter sends its signals via a path (not shown) to the antenna, that path including the terminal 11. With the switch 24 open, signals from the transmitter on the terminal 11 do not pass to the receiver 13, as described hereinabove.

Referring still to FIG. 1, assume that there is an error in the logic function in that the switch 24 is closed while transmission occurs. In such an event, the receiver would be damaged. To prevent such a calamity, the circuits of FIGS. 2, 3 and 4 provide for automatic override.

Referring to FIG. 3, the transistor 37 operates as a switch, similar to that of the switch 24 depicted in FIG. 1. In the case of an error in logic function, transmission may be initiated while the transistor 37 is conducting. In such event, with the circuit in FIG. 3, the transmission signal, present on the terminal 11, passes through the diode 16, the resistor 22, the rf choke 34, up through the resistor 46 to the negative terminal of the comparator 42. This high signal, present on the negative terminal of the comparator 42, exceeds the voltage present at the common junction of the resistors 47 and 48, which resistors operate as a voltage divider, providing a voltage of about 2 volts. The comparator 42, being activated, provides an output to the zener diode 39 to turn off the transistor 37. Hence, the comparator 42 provides an extra protection function.

Referring to FIG. 3, assume that the circuit was in the transmitting mode. In such event, the high voltage present on the terminal 11 would cause current to pass through the diode 16, charging the capacitor 18, and pass through the resistors 22 and 23, charging the capacitor 19. Assume that, subsequently, a receive signal was applied on the terminal 41 which would normally tend to cause the transistor 37 to conduct. In such a case, the high charge on the capacitors 18 and 19 would provide a high voltage to the negative side of the comparator 42 to tend to inhibit conduction of the transistor 37 for possibly a duration of one-half second. This one-half second delay, in some cases, is undesirable for certain purposes. It is, thus, desirable to provide an even faster circuit than that depicted in FIG. 3. The circuit depicted in FIG. 4 is just such a faster circuit.

Figure 4:
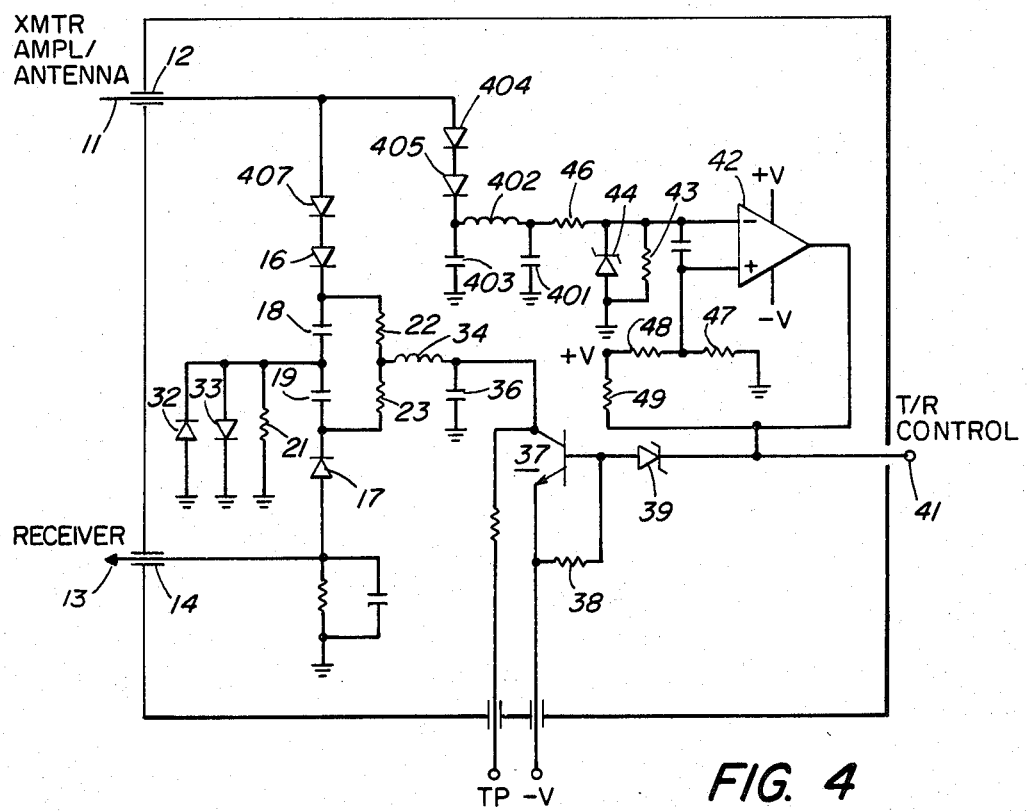
FIG. 4 is a diagram of another transmit/receive switching circuit, with automatic override, providing for a faster operation than the embodiment depicted in FIG. 3.

Referring to FIG. 4, it is noted that the comparator 42, in lieu of being coupled by the resistor 46 to the collector of the transistor 37, is connected via the resistor 46, choke 402 and the diodes 404 and 405 to the antenna directly. The circuit of FIG. 4 provides for a faster operation than the circuit of FIG. 3.

The circuit of FIG. 4 includes separate rectifying diodes in a fast filter to provide a much faster return from transmit to receive, the duration taking but a few hundred microseconds, whereas the circuit of FIG. 3 requires approximately one-half second to recover.

Referring now to FIG. 4, during the transmit operation, the voltage of the transmit/receive control line at the terminal 41 is low and the transistor 37 is non-conductive. In normal operation, during transmission, a 700 volt peak-to-peak rf signal is applied to the terminal 11 and is rectified by the diodes 407 and 16. The capacitor 18 charges on the first rf cycle, with the capacitor 19 lagging somewhat behind. Charging current, as well as reverse recovery current, produces a voltage at the capacitors 18 and 19 junction, limited by the back-to-back diodes 32, 33. The steady state voltage pulses are less than one volt and do not limit. The voltage on the two capacitors 18, 19 now stabilizes at 350 volts dc, with ac spikes of less than one volt. This high voltage now back-biases the diode 17, reducing its capacitance to a minimum and its feedthrough to about one millivolt. The remaining coil and capacitor circuit 15 resonates broadly at 450 KHz to aid in the removal of high frequency spikes and to provide a direct current path to ground. The one millivolt feedthrough provides a monitor signal for the receiver during transmission. No large transients are received by the receiver.

In the receiving mode in the circuit of FIG. 4, a high signal is provided to the terminal 41, causing the transistor 37 to conduct. Thus, the two capacitors 18 and 19 must discharge from its impressed +350 volts charge to zero, and the transistor 37 must then forward bias the two diodes 16 and 17 at about 20 milliamperes each. The transistor 37, which can be of the 2N5013 type, limits the peak discharge current to below its one ampere rating and accomplishes turnaround in under 100 milliseconds.

Once the diodes 16 and 17 are forward biased, the received signal enters the terminal 11, passes through the diode 16, the capacitors 18 and 19, and the diode 17. The resistor 21 and the diodes 32 and 33, in shunt of the junction of the capacitors 18 and 19, offer minimal attenuation for normal signals and transient protection.

In automatic operation, when a voltage (above say 11 volts) appears at the transmitter amplifier antenna terminal 11, the two series diodes 404 and 405 rectify such voltage and with the filter including the capacitors 401 and 403, the coil 402, and the resistor 46 activates the zener diode 44, thereby causing the comparator 42 to switch and apply a logic low signal to the base of the transistor 37. The transmit/receive switching circuit effectively enters the transmit mode and protects itself and the receiver. When the offending large signal dissipates, the switching circuit returns to its receive mode in less than one millisecond by virtue of the short time constants in the diode filter 401, 402 and 403. The two series diodes 404 and 405 augment the small filter 401, 402 and 403, minimizing rf feedthrough to the comparator 42. Thus, any transients are effectively clipped by the two back-to-back diodes 404 and 405, protecting the receiver. Hence, the overall circuit as depicted in FIG. 4 provides for a positive feedback toggling action, once the comparator 42 switches. The input voltage is altered by the transmit/receive action to enhance its condition so that there is no instability at the eleven volt point, for example.

In summary, the basic principle of the operation of the transmit/receive switching circuit is depicted in FIG. 1, a generalized improvement is depicted in FIG. 2, FIG. 3 depicts an automatic override circuit, and FIG. 4 depicts an even faster version than that depicted in FIG. 3.

Briefly, see FIG. 1, when it is desired to receive, the switch 24 is closed, which switch can be a transistor switch. The closing of the switch causes conduction of the two serially connected, polarity opposed diodes 16 and 17. The conduction of the diodes 16 and 17 provides a path for signals to pass from the terminal 11 through the diodes 16 and 17 and the capacitors 18 and 19 to the receiver terminal 13. When the switch 24 is open, the path is inoperative, so that signals from the antenna or the transmission amplifier that may be present on the terminal 11 do not pass through the diodes 16 and 17 simultaneously to cause an overload of the receiver and possibly damage it. Hence, the inventive concept, in a broad sense, is that opposite polarity coupled, serially connected diodes are caused to conduct during a receiving phase and made not to simultaneously conduct during the transmitting phase.

Various modifications may be performed without departing from the spirit and scope of this invention. For example, in lieu of an external dc path to ground between the input terminals 11 and 12 or between the receiver terminal 13 and the terminal 14, transformer coils can be supplied to provide the grounding path. The voltage sources for the comparator 42 can be separate power sources or can be common to other power sources in the circuit. Control logic signals to the terminal 41 can be provided by any suitable technique.

What is claimed is:

1. A transmit/receive switching circuit for a radio transceiver comprising
   first means coupled to a transmitting amplifier and to an antenna;
   second means coupled to a receiver;
   a serial circuit coupled between said first means and said second means, said serial circuit including a first diode poled in one direction, capacitive means, and a second diode poled in a direction opposite to said one direction;
   control means operative during a receiving phase of said transceiver, for providing a first condition to cause both of said serially connected, polarity opposed diodes to simultaneously conduct, so that radio signals received by said antenna can pass through said first means, said serial circuit, and said second means to said receiver, and
   operative during a transmitting phase of said transceiver for providing a second condition to cause both of said serially connected, polarity opposed diodes to not simultaneously conduct, so that neither transmission signals from said transmitting amplifier nor radio signals from said antenna can pass through said first means, said serial circuit, and said second means to said receiver;

a resistive direct current path across said capacitive means, and means responsive to the first condition of said control means for selectively applying a voltage potential to said path of such magnitude and polarity to cause both said first diode and said second diode to undergo conduction.

2. The circuit as recited in claim 1 wherein said means for selectively applying a voltage potential comprises a switch.

3. The circuit as recited in claim 2 wherein said switch comprises a transistor.

4. The circuit as recited in claim 3 further comprising an automatic override means, coupled to said transistor, for causing said transistor to cease conduction in the event said transistor had been conducting when transmission signals are initiated from said amplifier.

5. The circuit as recited in claim 4 wherein said automatic override means includes a comparator circuit coupled to compare the magnitude of voltage obtained via a coupling to a point on said path, against a standard, to cause said transistor to cease conduction in the event said magnitude exceeds said standard.

6. The circuit as recited in claim 4 wherein said automatic override means includes a comparator circuit coupled to compare the magnitude of voltage obtained via a coupling to a point on said first means, against a standard, to cause said transistor to cease conduction in the event said magnitude exceeds said standard.

* * * * *